United States Patent Office 3,220,092
Patented Nov. 30, 1965

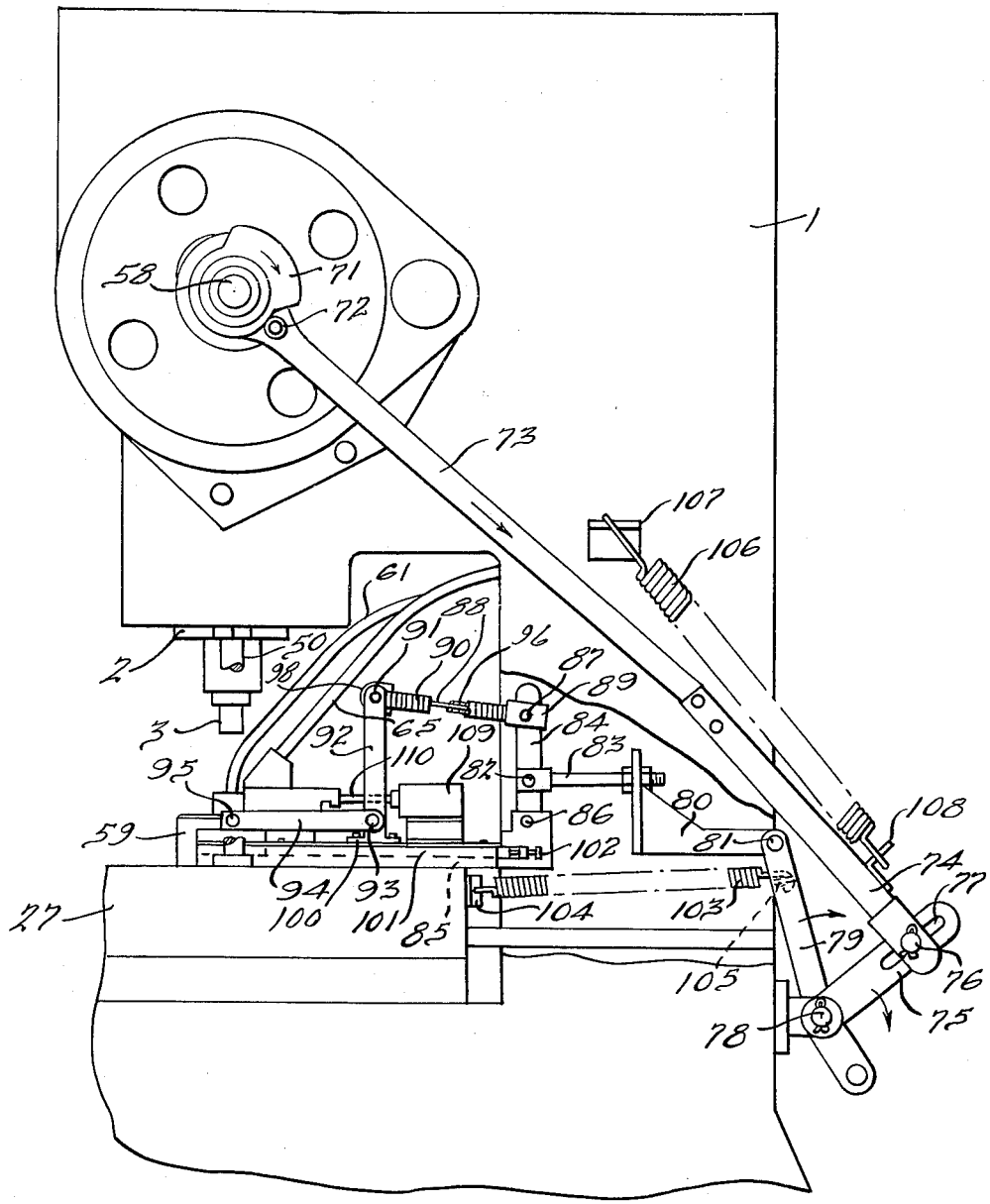

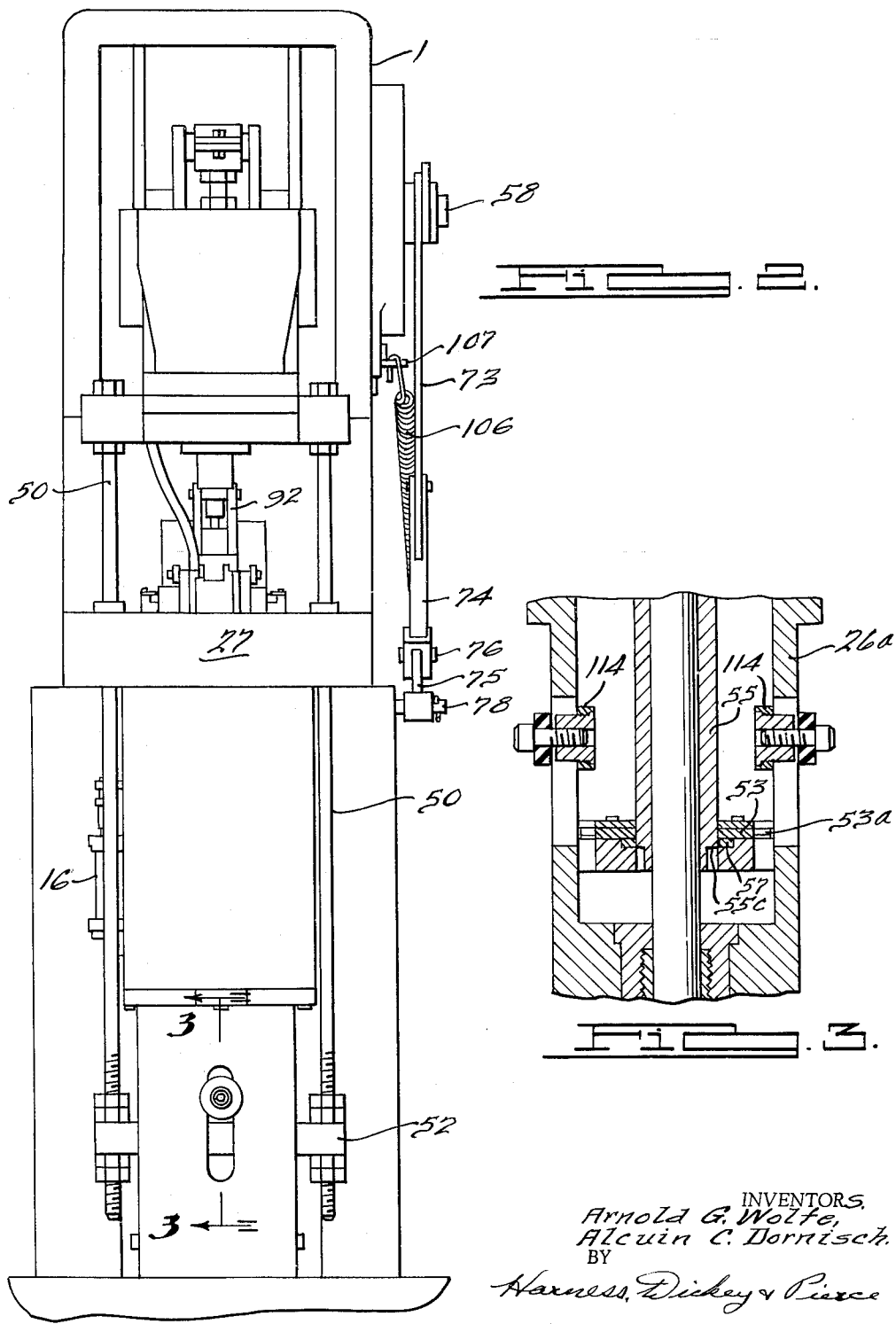

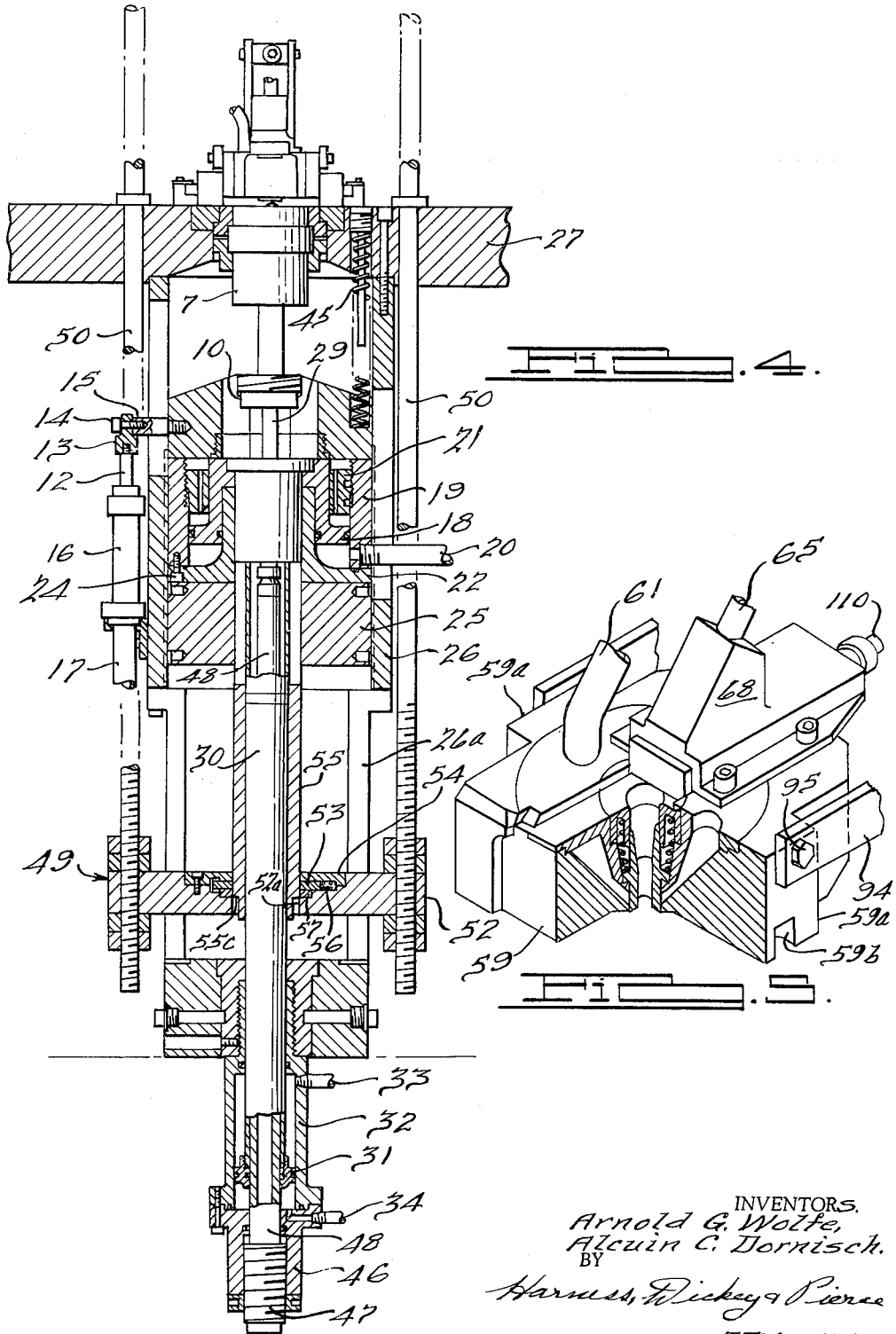

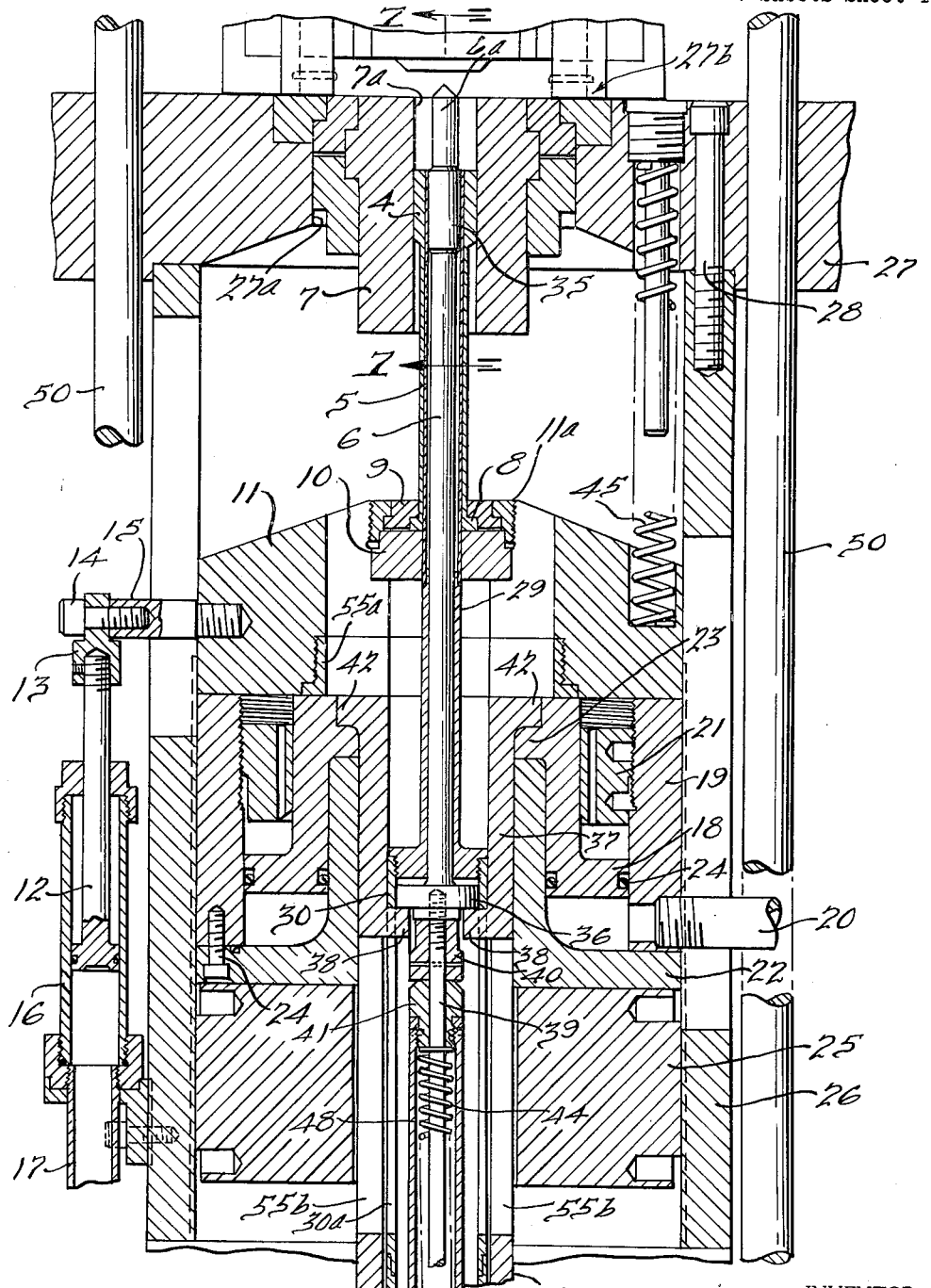

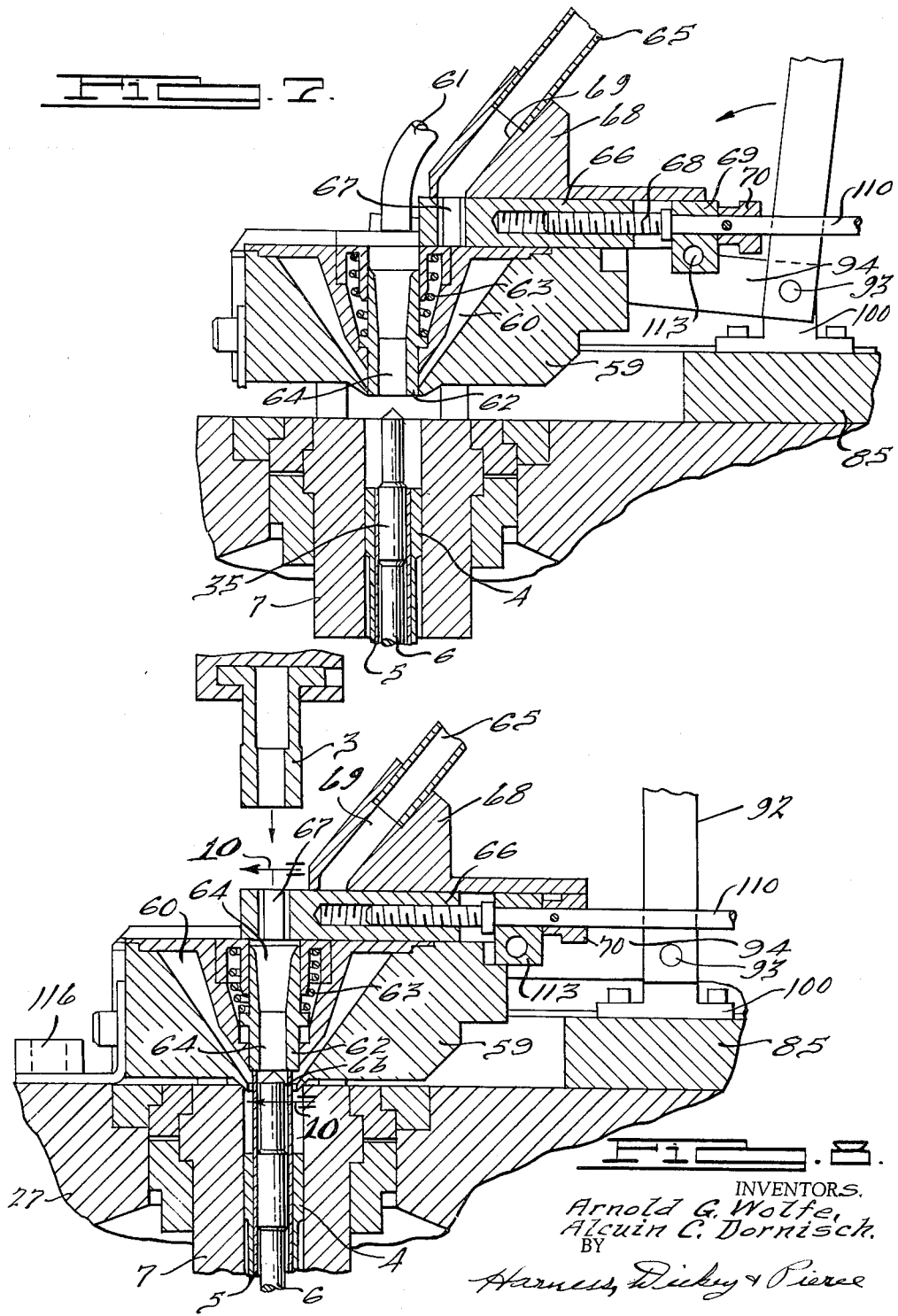

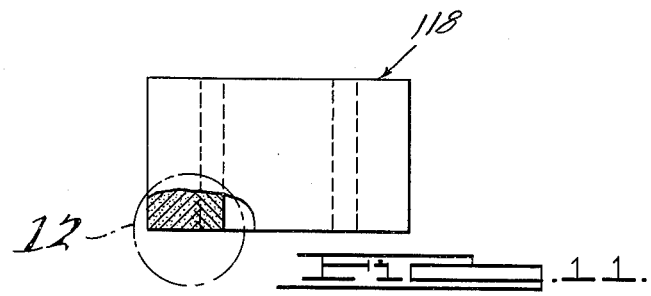
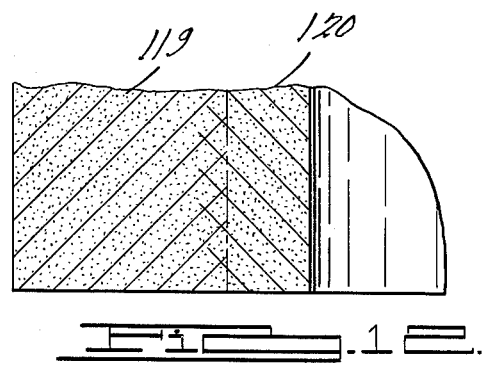
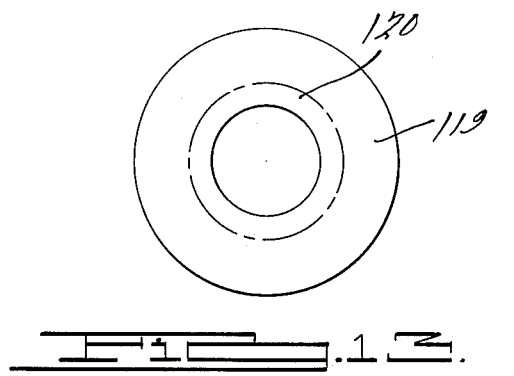

3,220,092
METHOD AND APPARATUS FOR MANUFACTURING COMPOSITE BEARINGS
Arnold G. Wolfe and Alcuin C. Dornisch, St. Marys, Pa., assignors to Powder Metal Products, Inc., St. Marys, Pa., a corporation of Pennsylvania
Filed Dec. 9, 1963, Ser. No. 329,081
13 Claims. (Cl. 29—149.5)

This invention relates generally to an improved method and apparatus for manufacturing powdered metal bearing bushings or sleeve bearings.

Experiments have shown that compacted powdered bronze possesses highly desirable bearing properties because it will provide an excellent wear-resistant and anti-friction surface. Compacted powdered bronze also possesses the porosity necessary to retain lubricating oil therein, which is desirable in a permanently lubricated bearing. However, an entire tubular or sleeve bearing constructed of powedered bronze is quite expensive. Furthermore, the use of bronze throughout the bearing is not necessary since only one surface, that is, either the inner or the outer surface of the bearing will be subjected to wear in use. The specific bearing which will be illustrated and described herein is the type where the inner tubular layer is the bearing surface, although the reverse arrangement would be possible in a bearing construction in accordance with the invention.

It has been found that a tubular sleeve bearing constructed from powdered bronze molded within and surrounded by a powdered iron body will possess adequate strength and excellent bearing properties, yet will involve substantially lower material costs than an all bronze bearing. In accordance with the present invention, such a bearing is manufactured by separately depositing the powdered bronze and powdered iron, into a die cavity. A stepped solid cylindrical core pin is located centrally of the die cavity and is longitudinally movable therein. A thin tubular sleeve is also movably mounted in the die cavity and snugly fits the core pin at its larger diameter portion and forms with the smaller diameter portion of the core pin a first tubular cavity. The outer diameter of the tubular sleeve is considerably less than that of the die cavity thereby forming a second tubular cavity. Thus, the powdered bronze may be deposited in the inner first tubular cavity while the powdered iron is deposited in the outer second tubular cavity. A lower pressing punch snugly surrounds the tubular sleeve and is closely received within the die cavity to retain the powdered iron in the die cavity.

Thereafter, the tubular sleeve is lowered, allowing the two powdered metals to contact each other. The powdered metals are then compressed axially within the die cavity around the core pin between an upper punch and the lower punch to form a molded solid tubular body. The body is then ejected from the die cavity and is sintered in a furnace under a temperature which will join the two powdered metal layers together.

The bearing formed from the powdered iron and bronze has intercommunicating porosity throughout. Thus, it may then be immersed in oil with the oil being absorbed throughout the pores in both the iron and bronze layers to form a permanently lubricated bearing.

An object therefore of the present invention resides in the provision of an improved method and apparatus for manufacturing a composite powdered metal bearing of distinct layers of dissimilar powdered metals in a single operation in which an external surface of the bearing is composed solely of a desired wear-resistant, low friction metal and the remaining portion of the bearing consists of a lower cost material possessing the necessary structural strength.

It is another object of the present invention to provide an improved method and apparatus for manufacturing a tubular powdered metal bearing of distinct layers of dissimilar metals in which both layers are porous and the pores of the layers are interconnected, whereby lubricants stored in the pores of one layer are free to flow into the pores of the other layer.

A further object of the present invention resides in the provision of an improved method and apparatus for manufacturing a tubular powdered metal bearing having distinct layers of dissimilar metals wherein the two layers are completely joined together throughout their areas of contact to form an integral high strength unitary bearing member.

A further object of the present invention lies in the provision of an improved bearing forming apparatus of the above character which is entirely automatic in operation, which is readily adjustable for making different size bearings and which will automatically eject compacted powder metal bearing units ready for sintering.

A further object of the present invention is to provide an improved method of manufacturing a tubular powdered metal bearing of distinct layers of dissimilar powdered metals which is simple to perform and results in a bearing which is sturdy in construction, reliable in use and economical to make.

A further object of the present invention is to provide an improved apparatus for manufacturing a tubular powdered metal bearing of dissimilar metals in distinct layers which is compact in design, efficient in performance, reliable in operation and relatively inexpensive to construct.

Other objects and advantages of the present invention will be apparent from the following detailed description taken in conjunction with the drawings, in which:

FIGURE 1 is a side elevational view of a machine constructed in accordance with the present invention;

FIG. 2 is a front elevational view of the apparatus shown in FIGURE 1;

FIG. 3 is an enlarged sectional view of FIGURE 2 taken along line 3—3 thereof;

FIG. 4 is a sectional view of the machine constructed in accordance with the present invention;

FIG. 5 is an enlarged view of the shoe assembly partially shown in section;

FIG. 6 is an enlarged sectional view of a portion of FIGURE 4 showing the details of the bottom punch, the liner sleeve and the core pin;

FIG. 7 is a sectional view of FIGURE 6 taken along the line 7—7 thereof;

FIG. 8 is a view similar to FIGURE 7 but with the parts in position to cause the metal powder to be deposited in the die cavity;

FIG. 11 is an elevational view of a composite liner type bearing manufactured according to the present invention;

FIG. 12 is an enlarged sectional view of the portion 12 of FIG. 11;

FIG. 13 is a plan view of FIGURE 11.

Figure 9:
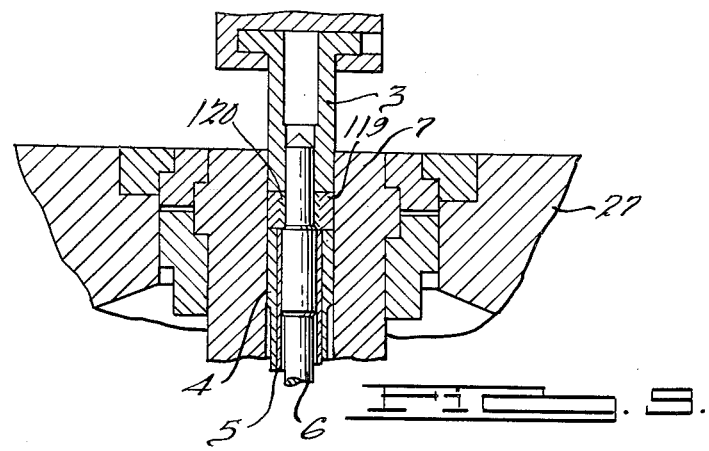
FIG. 9 is a fragmentary sectional view showing the upper and lower press punches in their compressing position.

Referring now to the drawings, FIGS. 1 and 2 illustrate a die press housing 1 supporting a vertically reciprocable upper ram 2. Carried at the lower end of the ram 2 and vertically movable therewith is an upper press punch 3.

A stationary base plate 27 is fixedly attached to the housing 1 and carries a lower forming die structure. The plate 27 has a central opening 27a which receives a stationary forming die 7 secured in place by a retaining ring 27b (FIG. 6). A lower punch 4 is slidably received in an axially extending opening 7a formed in the die 7. The lower punch 4 has a radial flange 8 formed at the lower end thereof which is removably fixed to a vertically reciprocating lower ram head 11 by a punch collet 9, a punch block 10 and a nut 11a threaded onto the ram head 11 (FIG. 6). A plurality of springs 45 only one of which is shown, act between the base plate 27 and the lower ram head 11 to bias the lower ram head 11 downwardly. A cylinder housing 26 which is fixed to the plate 27 by bolts 28 slidably guides the lower ram head 11. Thus, the lower punch 4 will vertically reciprocate with reciprocation of the lower ram head 11.

A ram actuating piston 12 mounted within a cylinder 16 is pivoted to the lower ram head 11 by a piston connector 13 and a pair of pivot pins 14 and 15. A conduit 17 supplies and exhausts hydraulic fluid to and from the lower end of the cylinder 16 to control the movement of the piston 12 and thus the lower ram head 11. An appropriate valve (not shown) can be interposed in the fluid conduit 17 to control the fluid flow therethrough.

A thin cylindrical liner sleeve 5 is snugly but slidably received within the lower punch 4 and has its lower end 5 fixed to a sleeve extension 29. A secondary ram tube 30 is threadedly engaged at its upper end with the lower end of the sleeve extension 29 and at its lower end with a secondary ram piston 31 (FIG. 4). This secondary ram piston 31 is vertically reciprocable within a secondary ram air cylinder 32. A pair of air supply lines 33 and 34 intercommunicate the opposite ends of the secondary ram air cylinder with an air pressure source (not shown). Thus, as the air pressure is supplied to the secondary ram air cylinder 32 alternately through the lines 33 and 34, the secondary ram piston 31 will reciprocate vertically causing corresponding vertical reciprocation of the liner sleeve 5.

A core pin 6 is shown in FIGURE 6 as slidably received within the liner sleeve extension 29 and the liner sleeve 5. An upper end portion 6a of the core pin 6 has a diameter which is slightly less than the internal diameter of the liner sleeve 5. An enlarged cylindrical shoulder portion 35 is formed on the core pin 6 immediately beneath the upper end portion 6a and is closely slidably received within the liner sleeve 5. Thus, a cylindrical cavity 6b is formed between the core pin portion 6a and the liner sleeve 5 above the shoulder portion 35.

The core pin 6 is formed at its lower end with a radial flange 36 slidably received within the secondary ram tube 30. A yoke 37 surrounds the upper portion of the secondary ram tube 30 and has a pair of opposed radially inwardly extending shoulders 38 formed on the lower end therof. A pair of opposed axially extending slots 30a formed in the secondary ram tube 30 receive the shoulders 38 which abut the lower surface of the flange 36 on the core pin 6.

A vertically movable annular piston 18 is shown positioned within a cylinder 19 threaded into the housing 26. A conduit 20 supplies hydraulic fluid from a fluid pressure source (not shown) to the cylinder 19 for moving the piston 18 upwardly. A nut 21 is adjustable within the cylinder 19 to limit the upward movement of the piston 18. A cylinder bottom member 22 is fixed to the cylinder 19 by bolts 24 and closes the cylinder 19 at its lower end and sealingly contacts the inner diameter surface of the piston 18. The member 22 also limits downward movement of the piston 18 by engagement with a radially inwardly extending flange 23 formed thereon. The cylinder 19 is locked in its adjusted axial location by a locking nut 25, threadedly received within the housing 26 and abutting the lower surface of the cylinder bottom member 22.

The yoke 37 has a pair of diametrically opposed ears 42 at its upper end which abut the upper surface of the flange 23. Thus, when hydraulic fluid is supplied to the cylinder 19 through the conduit 20, the piston 18 will be moved upwardly carrying with it the yoke 37, the core pin 6, and the lower punch 4, since the piston 18 abuts the lower surface of the lower ram head 11.

The core pin 6 and the liner sleeve 5 are adapted to be vibrated by a means partially illustrated in FIGURE 6. Thus, a core rod 39 is slidably received in a core block 41, and is threaded through a nut 40 and into the radial flange 36 of the core pin 6. A tube 48 depends from the core block 41 and is adjustably threaded at its lower end 47 to an air cylinder 46 (FIG. 4). A spring 44 acts against a shoulder (not shown) formed on the lower end of the core rod 39 thus acting to bias the core rod 39 downwardly. Any appropriate vibrator means such as a pneumatic motor may be attached to the lower end of the core rod 39 to vibrate it against the action of spring 44, thus vibrating both the core pin 6 and the liner sleeve 5 to enhance the filling of the die cavities by the bronze and iron powders.

The manner in which the elements described thus far operate is as follows. The lower punch 4 is first in a position where its upper end is flush with the top of the die 7 while the top of the liner sleeve 5 is approximately 1 inch above the top of the die 7. The lower punch 4 is lowered, by exhausting pressure from the ram drop cylinder 16 and by the springs 45 acting against the ram head 11, to a position where the top edge of the punch 4 is flush with the top of the shoulder 35. While the lower punch 4 is moving downwardly, powdered iron is deposited into the cavity between the liner sleeve 5 and the die wall 7a. A measured amount of powdered bronze is also deposited in the cavity 6b at this time. The core pin 6 and the liner sleeve 5 are vibrated to enhance this fill. The liner sleeve 5 is lowered to a position where its top edge is flush with the top of the lower punch 4 and with the top of the shoulder 35 on the core pin 6 by supplying air under presure to the top of the piston 31 through the conduit 33. As the sleeve 5 is lowered, the bronze and iron powders fill in the area previously occupied by this sleeve.

Hydraulic fluid is next supplied by the conduit 20 to the cylinder 19 thus moving the piston 18 upwardly. This will cause the lower punch 4 to move upwardly as well as the liner sleeve 5 and the core pin 6. At this same time, the upper ram 51 is moved downwardly and carries with it the upper punch 3 thereby compressing the powdered metal contained in the die 7 with a pressure of between 40,000 and 50,000 p.s.i. causing it to be molded into a unitary cylindrical body 118 with an outer annular layer 119 of iron and an inner annular layer 120 of bronze, as illustrated in FIGS. 9 and 11-13. The bearing now having been molded must be ejected from the die cavity 7a and the structure for carrying out this step will now be described.

Fixedly attached to the upper ram 2 are a pair of spaced rods 50. An ejector plate 52 threadedly receives the lower ends of the rods 50 and slidably receives a ram tube 55 within a central opening 52a thereof. The ram tube 55 has an enlarged portion 55a at its upper end threadedly received in the ram head 11 and a reduced diameter portion having a radial shoulder 55c at its lower end. A pair of diametrically opposed longitudinal slits 55b are provided in an intermediate portion of the ram tube 55 to slidably receive the yoke 37. An opposed semi-circular pair of ejector blades 53, retained on the ejector plate 52 by a cover member 54, are each biased radially inwardly by a spring 56. A bushing 57 is positioned beneath each ejector blade 53 to facilitate easy sliding movement thereof. Thus, upon downward movement of the upper ram 2 during the molding stroke, the rods 50 carried therewith will move the ejector plate 52 downwardly with respect to the ram tube 55 until the blades 53 are free to move inwardly under the action of the springs 56 to engage beneath the radial shoulder 55c. When the upper ram 51 now begins its upward movement after the molding stroke is completed, the blades 53 will cause the ram tube 55 to move upwardly as well as the upper ram head 11 and the lower punch 4 until the molded bearing has been ejected from the die cavity 7b.

The ejector blades 53 are formed at their mating faces with opposed downwardly sloped wedge surfaces 53a. A main cylinder bottom 26a has fixedly retained thereon a diametrically opposed pair of wedges 114 each of which is formed with a pair of upwardly sloped wedge surfaces complementary to and engageable with the wedge surfaces 53a. The wedges 114 are vertically adjusted on the main cylinder bottom 26a so that when the ejector plate 52 moves upwardly to an extent sufficient to eject the molded bearing from the die cavity 7a, the wedges 114 will engage the wedge surfaces 53a on the blades 53 and will move these blades 53 radially outwardly against the action of springs 56. Thus the blades 53 will be disengaged from the shoulder 55c and the ejector plate 52 will be permitted to continue its upward movement without further upward movement of the ram tube 55. The ejector plate 52 is positioned on the rods 50 so that only when the upper ram 51 has moved through its complete downward molding stroke will the blades 53 be moved beneath the radial shoulder 55c on the ram tube 55. Fluid under pressure is then supplied by the conduit 17 to the ram drop cylinder 16 to position the lower punch 4 for the next filling operation with its top surface flush with the top of the die 7. As the ejection cycle began the air cylinder 32 was supplied with air under pressure by the conduit 34 thus moving the liner sleeve 5 upwardly to aid in the ejection cycle and to position the liner sleeve for the next filling operation.

The apparatus for depositing the metal powders into the cavity of the die 7 is shown in FIGURES 1, 7, 8 and 10 and will now be described. The housing 1 rotatably supports a camshaft 58 which has fixedly mounted thereon a cam 71. The camshaft 58 is continuously rotated during operation of the apparatus by a drive source (not shown). An arm 73 to which an extension 74 is fixed is loosely mounted upon the camshaft 58 for limited radial movement when a cam follower 72 fixed to the arm 73 engages the cam 71. A spring 106 fixed at one end to the housing 1 by a bracket 107 is fixed at its other end to the extension 74 by a bracket 108. The spring 106 will maintain the cam follower 72 in engagement with the cam 71.

Pivotally and slidably connected to the extension 74 by a pin 76 and a slot 77 is a lever 75 which in turn is fixedly attached to a lever 79 by a pin 78. Thus, as shown in FIGURE 1, when the high portion of the cam 71 engages the follower 72 and moves the arm 73 away from the camshaft 58, both the levers 75 and 79 will pivot clockwise about the axis of the pin 78. A tension spring 103 is fixed at one end to the lever 79 by a bracket 105 and at its other end to a bracket 104 fixed to the plate 27. This spring will tend to pivot the lever 79 counterclockwise and will help maintain the follower 72 in engagement with the cam 71.

Pivotally connected to the lever 79 by a pin 81 as a bracket 80 which has a rod 83 fixed thereto. An arm 84 is pivoted at one end to a horizontal slide plate 85 by a pin 86 and is pivotally connected at its other end to a bracket 89 by a pin 87. The rod 83 is pivotally secured to an intermediate portion of the arm 84 by a pin 82.

A pair of spaced parallel arms 92 are fixedly attached to a pin 93 freely mounted in a bracket 100 which is fixed to the top of the slide plate 85. A second pair of spaced parallel arms 94 are also fixedly attached to the pin 93 for a purpose to be hereinafter described.

Fixed to the pivot pin 91 is a rod 88 which is slidably received in a tube 96 fixed to the pivot pin 87. A helical compression spring 90 surrounds the rod 88 and the tube 96 and abuts at one end the bracket 89 while its other end is in engagement with a bracket 98 fixed to the pivot pin 91. Thus, counterclockwise pivotal movement of the arm 84 about the pin 86 as viewed in FIGURE 1, will cause corresponding counterclockwise pivotal movement of the spaced arms 92 through the compression spring 90.

The spaced parallel arms 94 are pivotally mounted to a filler shoe body by a pair of bolts 95. See FIGURE 10. The filler shoe body 59 is provided with an opposed pair of lateral extensions 59a, each of which has a recess 59b. An opposed pair of vertical ways 59c fixed to the slide plate 85 vertically guide the filler shoe body 59 by slidably receiving the lateral extensions 59a. Each of the vertical ways 59c has a horizontal plate 99 fixed thereto. A pair of helical compression springs 97 are positioned one between each of the plates 99 and the top of its respective recess 59b thereby normally maintaining the filler shoe body in a raised position. However, counterclockwise pivotal movement of the spaced arms 92 and thus the spaced arms 94 caused by a force sufficient to overcome the force of the springs 97 will move the filler body 59 downwardly within the vertical ways 59c.

The horizontal slide plate 85 is disposed for sliding movement between a pair of spaced parallel ways 101 fixed to the plate 27. See FIGURES 1 and 10. An adjustable stop screw 102 extends outwardly at each lateral edge of the slide plate and these screws are positioned for engagement with the ends of the respective ways 101, when the slide plate 85 is moved toward the left as viewed in FIGURE 1. Thus, as the cam follower 72 rides up the high portion of the cam 71, the arm 73 will be moved in the direction of the arrow shown in FIGURE 1 and will cause clockwise pivotal movement of the levers 75 and 79. The bracket 80 will then be moved toward the right as viewed in FIGURE 1 causing the slide plate 85 to also be moved toward the right, the springs 97 insuring that the filler shoe 59 is in its raised position. When the cam follower rides off the high portion of the cam 71, the springs 106 and 103 will cause counterclockwise pivotal movement of the levers 75 and 79 and thus movement of the bracket 80 and the rod 83 toward the left as viewed in FIGURE 1. The slide plate 85 will also move leftward until the adjustable screws 102 abut the end of the spaced ways 101. Further leftward movement of the rod 83 will then pivot the arm 84 counterclockwise and through the spring 90 will cause counterclockwise pivotal movement of the arms 92 and 94. The filler shoe 59 is thus moved downwardly against the spring 97 in preparation for the filling step. A stop 116 fixed to the filler shoe 59 limits the downward movement of the filler shoe 59 by abutting the base plate 27.

The design of the spring 97 is such that the filling shoe is maintained in its raised position until the stop screws 102 come into contact with the ends of the ways 101, as described above. Only by the then increased force tending to pivot the arms 84, 92 and 94 will the upward force of the springs 97 be overcome.

The spring 90 will allow lost motion in the pivotal movement of the arm 84 with respect to the arms 92. Thus the arm 84 may be designed to over-travel in its counterclockwise pivotal movement without damaging the filler shoe body 59.

Figure 10:
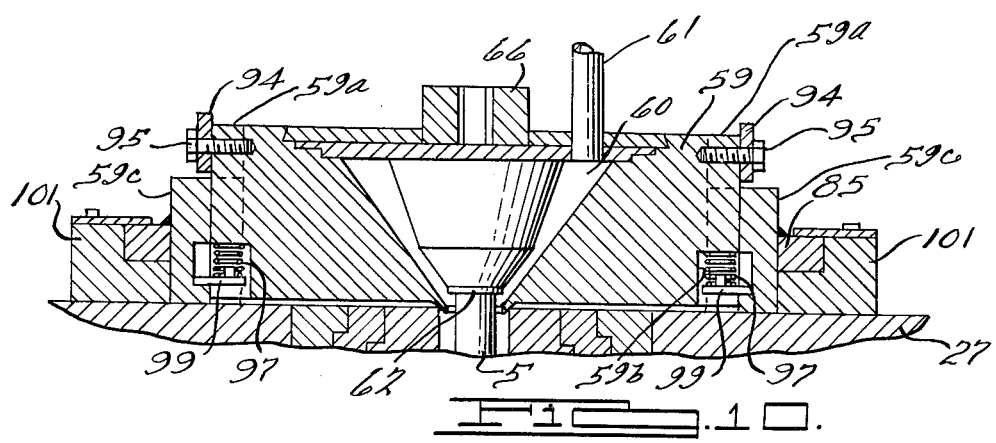
FIG. 10 is a sectional view of FIGURE 8 taken along the line 10—10 thereof.

The details of the filler shoe body are best shown in FIGURES 7, 8 and 10. A chamber 60 is continuously supplied with powdered iron by a conduit 61 and is normally closed at its lower end by a piston member 62 slidable vertically within the filler shoe 59 and normally biased downwardly by a spring 63. The piston 62 is designed with an axial extending passage 64 open at both ends.

A conduit 65 will continuously supply powdered bronze to an opening 69 formed in an adapter member 68 which is fixed to the filler shoe 59. A horizontal slide member 66 is provided with an opening 67 and is movable from a position where the opening 67 communicates with the opening 69 to a position where the opening 67 communicates with the opening 64 in the piston 62. See FIGURES 7 and 8. Thus, a measured amount of bronze powder from the conduit 65 can be deposited into the opening 64 by moving the slide member from its FIGURE 7 to its FIGURE 8 position. A pneumatic motor 109 drives a piston rod 110, threadedly engaged with the slide member 66, between these two positions. Adjustment of the measured amount of bronze powder deposited into the opening 64 is accomplished by merely rotating the piston rod 110 by an adjustment nut 70 pinned thereto. Thus, the position of the horizontal slide 66 will be shifted causing a variable amount of the opening 67 to communicate with the opening 69. An agitator motor may be connected to a block 113 to enhance depositing of the powdered bronze by vibrating the slide member 66.

The operation of the filler shoe body is as follows. The camshaft 58 continuously rotates the cam 71 and when the follower 72 begins to ride off the high portion of the cam 71, the filler shoe 59 is moved toward the left, as viewed in FIGURE 1, until the stop screws 102 abut the ends of the ways 101. The filler shoe is now in the location depicted in FIGURE 7. The lower punch 4 is lowered to a position with its top edge flush with the top of the shoulder 35 on the core pin 6, while the liner sleeve is positioned with its top edge one inch above the top of the die 7.

Continued rotation of the cam 71 will cause the follower 72 to descend further off the raised portion of the cam 71. Since the stop screws 102 prevent further leftward movement of the slide plate 85, the arms 84, 92 and 94 will be pivoted counterclockwise, as viewed in FIGURE 1, thus causing downward movement of the filler shoe 59 until the stop 116 abuts the base plate 27. In this position, the sleeve 5 will have engaged the lower end of the piston member 62 moving the same upwardly against the spring 63 and uncovering the chamber 60. See FIGURE 8. Powdered iron will then be permitted to flow into the cavity formed between the liner sleeve 5 and the wall of the die 7. The powdered iron deposited into the die cavity is not measured; rather, it just continues to flow insuring that the cavity formed between the liner sleeve 5 and the wall of the die 7 is completely filled. At the same time, the pneumatic motor 109 is actuated to move the slide member 66 from the position shown in FIGURE 7 to the position shown in FIGURE 8. A measured amount of powdered bronze is thus deposited through the opening 64 and into the chamber 6a.

As the cam follower 72 begins riding up the raised portion of the cam 71, the force of the springs 106 and 103, will be overcome. The springs 97 will first raise the filler shoe body and thereafter the entire filler shoe assembly will be moved toward the right, as viewed in FIGURE 1, in preparation for the molding step and ejection step, both of which were hereinabove described.

The cylinder 19 is adjusted axially of the cylinder 26 to halt downward movement of the lower press punch 4 when its upper surface is flush with the top of the flange 35 on the core rod 6. The amount of powdered iron and bronze deposited into their respective cavities within the die 7 is sufficient to fill these cavities while the finished molded bearing has an axial length of about one-half the cavity length due to the extremely high pressure exerted during the molding stroke. However, by axial adjustment of the cylinder 19 within the cylinder 26, and by adjustment of the rod tube end 47 within the cylinder bottom 46, the lower limit of the movement of both the lower press punch 4 and the core rod 6 will be adjusted thus varying the axial dimensions of the powder cavities within the die 7. Accordingly, a greater or lesser amount of the metal powders will be carried by their respective cavities and a correspondingly longer or shorter axial length bearing will be formed. Adjustment of the lower limits for the punch 4 and the core and rod 6 movements is accompanied by corresponding adjustment of the horizontal slide 66 on the filler shoe body 59.

The formed bearing 118, after it has been ejected from the die 7, is sintered to unite or join the adjacent metal particles together into one solid, but porous member. The particles of metal are not only united within each layer, but the particles of iron are joined to the particles of bronze at the interface between the layers. The bearing may then be immersed in oil, a considerable portion of which is interspersed and absorbed throughout, and then finished to the desired specifications. Because of the simultaneous sintering of both the layers, the pores of the two layers intercommunicate to provide for the flow of oil from the pores in the iron to the pores in the bronze.

While the controls for the several fluid motors and the drives for the upper ram assembly and the core pin vibrator have not been set forth in detail, it is contemplated that a skilled technician is fully capable of providing appropriate timing switches, valves and mechanical drive means for the same. For example, all of the timing switches and mechanical drives can be controlled from the main camshaft 58.

While a specific form of the invention has been described and shown herein, various modifications in the details of the structure and arrangement of parts as well as the specific powdered metals used can be made without departing from the scope of the invention encompassed by the appended claims.

What is claimed is:

1. A method of making a composite powdered metal liner type bearing comprising the steps of depositing a first powdered metal substance into a hollow elongated enclosure of uniform cross section, depositing a second powdered metal substance into a second hollow elongated enclosure of uniform cross section positioned within said first enclosure, withdrawing the inner wall of the first enclosure and the outer wall of the second enclosure from said powdered metal substances and thereafter compressing said powdered metal substances within said enclosure to form an integral compressed product.

2. The method of making a composite powdered metal liner type bearing comprising providing a hollow die member having a cylindrical wall portion, providing a hollow cylindrical sleeve within said die, providing a cylindrical pin within said sleeve having an intermediate portion closely engaging said sleeve and an end portion spaced from said sleeve, depositing a first powdered metal substance between said die wall and said hollow sleeve, depositing a second powdered metal substance between said hollow sleeve and the end portion of said cylindrical pin, withdrawing said hollow sleeve from between said powdered metal substances, axially compressing said powdered metal substances within said hollow die wall and removing the compressed article from the die.

3. The method of making a composite powdered metal liner type bearing comprising providing a first cylindrical cavity defined by a cylindrical die wall, a cylindrical sleeve and a bottom punch engaging said die wall and said sleeve, providing a second cylindrical cavity within a first cylindrical cavity defined by the cylindrical sleeve, a cylindrical pin within the sleeve and a radial flange on said pin engaging said sleeve, depositing powdered metal substances into said first and said second cylindrical cavities, removing said sleeve from said powdered metal substances and compressing said powdered metal substances between an upper punch and said lower punch, cylindrical sleeve and a radial flange on said cylindrical pin.

4. A device for depositing a plurality of powdered metal substances into a die cavity comprising a body member laterally movable to a position over said die, said body member having a generally vertical opening extending therethrough, a continuous chamber completely surrounding said opening with the lower end of said chamber communicating with said opening, hollow tubular means movably mounted within said opening, resilient means biasing said tubular member in one direction to overlie and close the lower end of said chamber, means supplying a first powdered metal to said chamber, means supplying a second powdered metal to said opening and means for moving said tubular means away from the lower end of said chamber when said body member is positioned over said die.

5. A device for depositing a plurality of powdered metal substances into a die cavity comprising a body member laterally movable to a position over said die, said body member having a generally vertical opening extending therethrough, a continuous chamber completely surrounding said opening with the lower end of said chamber communicating with said opening, hollow tubular means movably mounted within said opening, a helical compression spring engaging and biasing said tubular member in one direction to overlie and close the lower end of said chamber, means supplying a first powdered metal to said chamber, means supplying a second powdered metal to said opening, and means associated with said die for moving said tubular means in a direction compressing said compression spring when said body member is positioned over said die.

6. A device for depositing a plurality of powdered metal substances into a die cavity comprising a body member laterally movable to a position spaced above said die, means to thereafter move said body member into contact with said die, said body member having a generally vertical opening extending therethrough, a continuous chamber completely surrounding said opening with the lower end of said chamber communicating with said opening, hollow tubular means movably mounted within said opening, resilient means biasing said tubular member in one direction to overlie and close the lower end of said chamber, means supplying a first powdered metal to said chamber, means supplying a second powdered metal to said opening, said die having a tubular sleeve movable therein to a position above said die, said tubular sleeve engaging with said tubular means when said body member is moved into contact with said die thereby moving said tubular means away from the lower end of said chamber.

7. A device for depositing a plurality of powdered metal substances into a die cavity including a body member laterally movable to a position over said die, a first opening formed in said body member and extending generally vertically therethrough, a continuous chamber completely surrounding said first opening with the lower end of said chamber communicating with said first opening, hollow tubular means movably mounted within said first opening, resilient means biasing said tubular member in one direction for overlying and closing the lower end of said chamber, means continuously supplying a first powdered metal to said chamber, means selectively supplying a second powdered metal to said first opening, comprising a conduit having an outlet disposed adjacent said body member, a slide member slidably mounted on said body member, a second opening formed in said slide member and extending generally vertically therethrough, said slide member being movable from a first position where said second opening communicates with said conduit outlet, to a second position where said second opening communicates with said first opening, and means moving said tubular means away from the lower end of said chamber when said body member is positioned over said die.

8. A device for depositing a plurality of powdered metal substances into a die cavity including a body member laterally movable to a position over said die, a first opening formed in said body member and extending generally vertically therethrough, a continuous chamber completely surrounding said first opening with the lower end of said chamber communicating with said first opening, hollow tubular means movably mounted within said first opening, resilient means biasing said tubular member in one direction to overlie and close the lower end of said chamber, means continuously supplying a first powdered metal to said chamber, means selectively supplying a second powdered metal to said first opening comprising a conduit having an outlet disposed adjacent said body member, a slide member slidably mounted on said body member, a second opening formed in said slide member and extending generally vertically therethrough, said slide member being movable from a first position where said second opening communicates with said conduit outlet to a second position where said second opening communicates with said first opening, means for adjusting the amount of the second opening which will communicate with said conduit outlet, and means moving said tubular means away from the lower end of said chamber when said body member is positioned over said die.

9. An apparatus for forming a composite powdered metal liner type bearing comprising a die having a cylindrical wall, a hollow cylindrical sleeve movably mounted within said die cavity, movable hollow cylindrical means surrounding said sleeve and closely engaging said cylindrical wall, cylindrical means movably mounted within said sleeve, said last mentioned cylindrical means having an intermediate portion closely engaging said sleeve and an end portion spaced from said sleeve, means for depositing a first powdered metal between said sleeve and said die cavity, means for depositing a second powdered metal between said sleeve and the end portion of said cylindrical means, means for compressing said powdered metal substances axially within said die cavity after said sleeve has been withdrawn from between said powdered metal substances to form an integral molded item, and means for ejecting said compressed item from said die cavity.

10. An apparatus for forming a composite powdered metal liner type bearing including a die having a first elongated cavity of uniform cross section and a second elongated cavity of uniform cross section surrounding said first cavity, means for depositing powdered metal substance into said first and second die cavities comprising a body member movable to a position over said die, said body member having first and second cavities therein, means supplying powdered metal substances to each of said cavities in said body member, means depositing said powdered metal substances from said first and second body member cavities to said first and second die cavities, respectively, when said body member is over said die, and means to compress said powdered metal substances within said die to form an integral compressed product.

11. An apparatus for forming a composite powdered metal liner type bearing comprising a body member having an annular chamber therein, means supplying a first powdered metal substance to said chamber, a closure member normally preventing flow of said first powdered metal substance out of said first chamber, said closure member having an opening extending therethrough, means selectively depositing a second powdered metal substance into said opening in said closure member when said body member is disposed over a die member, means moving said closure member to a position away from said chamber when said body member is disposed over said die member, said die member having two axially extending concentric cylindrical cavities therein for receiving said powdered metals from said chamber and said opening, respectively, and means to thereafter compress said powdered metals within said die to form an integral compressed product.

12. An apparatus for forming a composite powdered metal liner type bearing including a hollow cylindrical die member, means for depositing powdered metal substances into concentric cylindrical chambers formed within said die member and separated by a tubular member, means for thereafter withdrawing said tubular member from said powdered metal substances, means for compressing said powdered metal substances within said die member to form an integral compressed product, said compressing means comprising cylindrical means slidably received within said die member, a cylindrical member positioned above said cylindrical means and adapted to be positioned within said die member, said cylindrical member and said cylindrical means being movable toward each other within said die member to compress said powdered metal substances, and means operable in response to movement of said cylindrical member away from said cylindrical means, after compressing said powdered metal substances, to engage said cylindrical means and move the same adjacent the end of said die member thereby ejecting the compressed product from said die member.

13. An apparatus for forming a composite powdered metal liner type bearing including a hollow cylindrical die member, means for depositing powdered metal substances into concentric cylindrical chambers within said die member separated by a tubular member, means for thereafter withdrawing said tubular member from said powdered metal substances, means for compressing said powdered metal substances within said die member to form an integral compressed product, said compressing means comprising cylindrical means slidably received within said die member, a cylindrical member positioned above said cylindrical means and adapted to be positioned within said die member, said cylindrical member and said cylindrical means being movable toward each other within said die member to compress said powdered metal substances, means operable in response to movement of said cylindrical member away from said cylindrical means after compressing said powdered metal substances to engage said cylindrical means and move the same adjacent the end of said die member thereby ejecting the compressed product from said die member, and means to disengage said engaging means after the compressed product has been ejected.

References Cited by the Examiner
UNITED STATES PATENTS

| | | | |
|---|---|---|---|
| 2,299,192 | 10/1942 | Tormyn | 75—208 |
| 2,350,971 | 6/1944 | Pecker et al. | 264—111 |
| 2,447,434 | 8/1948 | Schwartzkopf | 264—111 |
| 2,541,531 | 2/1951 | Morris et al. | 29—149.5 |
| 2,549,939 | 4/1951 | Shaw | 29—420.5 |
| 2,562,876 | 8/1951 | Baeza | 18—16.5 |
| 2,700,209 | 1/1955 | Haller | 29—149.5 |
| 3,158,547 | 11/1964 | Smith | 18—16.7 X |

WHITMORE A. WILTZ, *Primary Examiner.*

THOMAS H. EAGER, *Examiner.*